March 15, 1949.  G. R. DEMPSTER  2,464,441
CONTAINER

Filed Dec. 20, 1945  2 Sheets-Sheet 1

INVENTOR.
George R. Dempster
BY
Cameron, Kerkam & Sutton
Attorneys

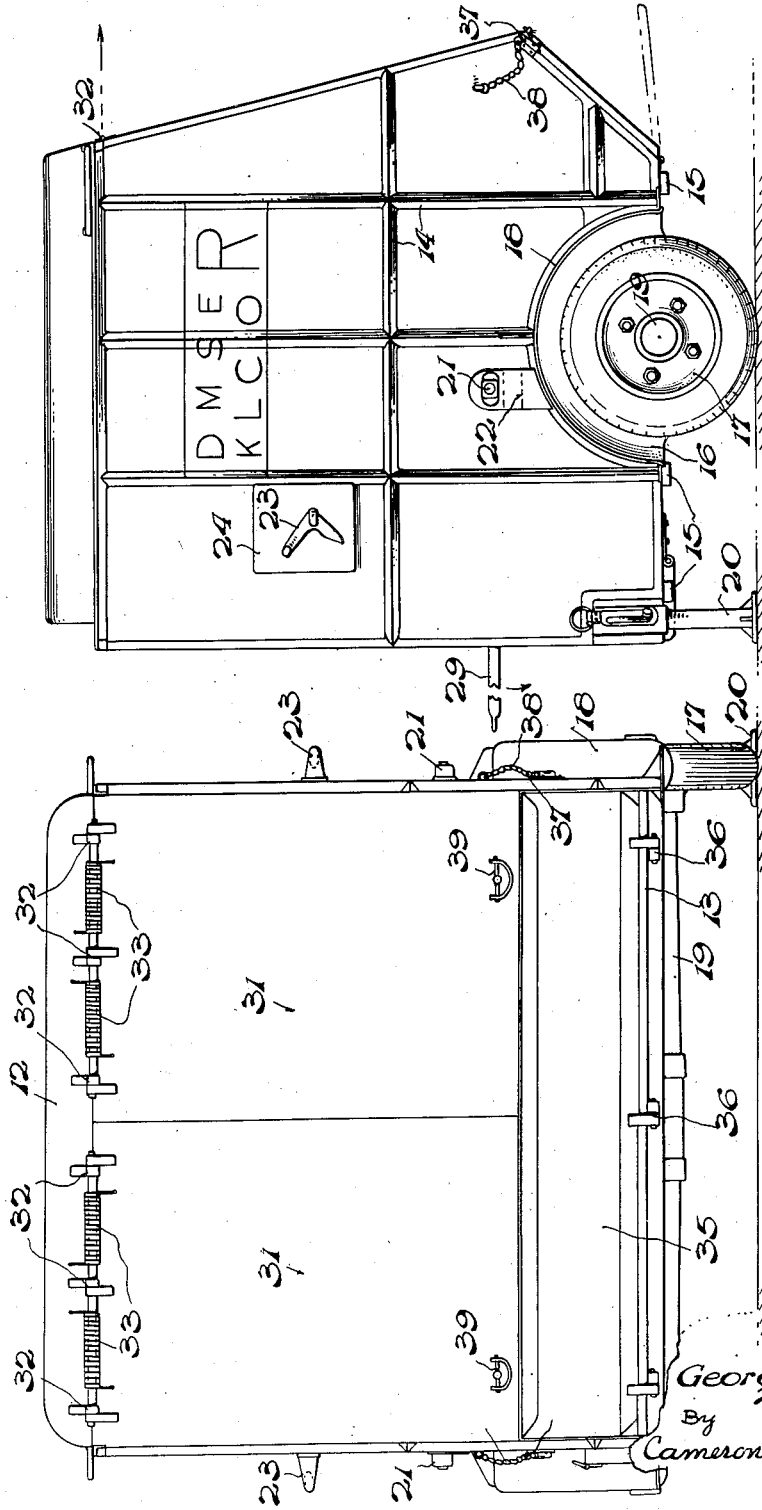

Patented Mar. 15, 1949

2,464,441

UNITED STATES PATENT OFFICE 2,464,441

CONTAINER

George R. Dempster, Knoxville, Tenn.

Application December 20, 1945, Serial No. 636,106

6 Claims. (Cl. 298—5)

This invention relates to containers and more particularly to wheeled containers.

More particularly still this invention relates to wheeled containers suitable for use with transporting and dumping vehicles such as those disclosed in my several United States patents such as, among others, United States Patent No. 2,281,183, granted me April 28, 1942.

Even more particularly this invention relates to wheeled containers suitable for use with transporting and dumping vehicles provided with cooperating doors for closing the rear or loading zone of the container to prevent spilling of the load or exposure of noxious contents.

It is accordingly an object of the present invention to provide a novel wheeled container for use with transporting and dumping equipment having cooperating doors for closing the rear or loading zone of the container.

It is another object of the present invention to provide a novel wheeled container for use with transporting and dumping equipment which is simple and easy to load manually and is provided with cooperating doors to allow maximum loading.

Another and further object of the present invention is to provide a novel wheeled container of pleasing appearance and light construction suitable for use in collecting refuse provided with cooperating doors over the loading zone to prevent spilling of contents, emission of noxious odors in transit and allowing of maximum loading.

Other and further objects of the present invention will appear as the description thereof proceeds.

In the accompanying drawings which show by way of illustration one embodiment of the present invention and in which like reference characters refer to similar parts:

Fig. 2 is a view of the embodiment of the present invention of Fig. 1 from the rear showing the construction of the cooperating doors; and Fig. 3 is a side view of the embodiment of the present invention of Fig. 1 showing the doors in closed position and the towing tongue in raised position.

Figure 1:
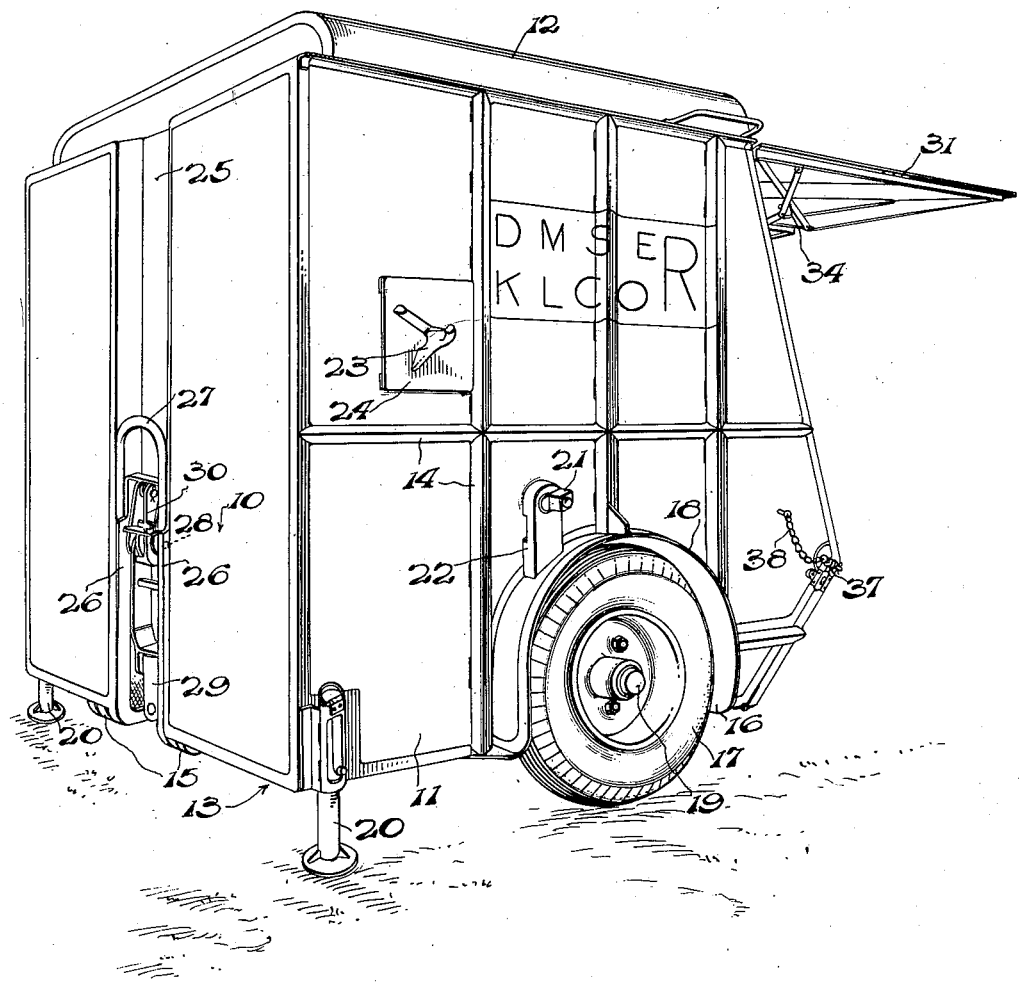
Fig. 1 is a view of one embodiment of the novel container of the present invention viewed from the front and side showing the container in position for manual loading.

Referring now to the several figures the novel container of the present invention is provided with an end wall 10, side walls 11, a top 12 and a bottom 13. The container is fabricated of light metallic construction and to provide necessary strength and rigidity side walls 11 may have reenforcing elements 14 and bottom 13 may be strengthened by cross members 15 all welded or otherwise suitably secured together. Side walls 11 may be suitably recessed at 16 to receive wheels 17 and may be provided with mud guards or fenders 18. Wheels 17 are mounted upon axle 19 which is secured to the container through springs if desirable.

Side walls 11 also carry jacks 20 of any suitable construction to form with wheels 17 four supporting elements for the container when at rest. Also mounted on side walls 11 and between the line of axle 19 and the line of jacks 20 are lifting pins 21 carried by reenforcing elements 22 to receive the lifting chains, cables or the like of a transporting and dumping rig as disclosed in my before referred to patents. As is common practice, chain deflectors 23 mounted on reenforcing plates 24 are also carried by said side walls to position the lifting chains in the proper direction when the container is being operated from the rig.

End wall 10 is vertically recessed at 25. Mounted in recess 25 and secured to reenforcing pieces 26 is pivoted bail 27. Also mounted in recess 25 as on pivot 28 is tongue 29 designed to rotate upwardly and outwardly to the position shown in Fig. 3 and to be held in this position by any suitable latch 30.

The open end of the container is partially closed by cooperating doors 31 (Fig. 2) hinged to top 12 by hinges 32. Hinges 32 are provided with springs 33 designed to counterbalance the weight of doors 31 and to hold them in raised or open position, safety arms 34 of any known construction being also provided to hold the doors 31 in open position.

Cooperating with doors 31 is door 35 hinged to bottom 13 at 36. Hinges 36 may be spring loaded if desired to counterbalance the weight of door 35. Door 35 is locked in closed position by pins 37 secured against loss by chains 38 and when unlocked can be rotated to the open position for loading or dumping shown by dotted lines in Fig. 3.

Doors 31 are locked in closed position against door 35 by any suitable manually operable latches 39.

The wheeled container of the present invention is designed primarily for refuse collection in residential areas. The refuse collecting crew may manually move the container from loading spot to loading spot using tongue 29 for this purpose or the container may be towed by tongue 29 by a light truck or tractor until loaded when it may be left until picked up and removed for dumping by any suitable transporting and dumping vehicle as identified above.

As will now be readily apparent the arrangement of doors 31 and 35 allows efficient manual loading of the container and permits of maximum loading. Doors 31 can be opened to an almost horizontal position and door 35 lowered to relatively low clearance from the ground enabling heavy objects to be readily loaded. As loading progresses and the container fills door 35 is first closed and thereafter as the container is still further loaded one or the other of doors 31 is closed and the entire container thereafter loaded and when completely filled the other door 31 is closed.

When loaded the container may be left to be picked up by any suitable transporting and dumping vehicle such as those described in my several patents. The chains of such a vehicle are attached to lifting pins 21 and the container raised from the ground and transported to the dumping area. There bail 27 is engaged by the hook on the vehicle rig to support the container during dumping in a manner well known in the art, and after either or both doors 31 and 35 have been opened the chains are slackened to allow the container to rotate to dumping position, the chain deflectors 23 acting to control this rotation and to assist in righting the container after dumping.

It will now be apparent that the present invention provides a novel wheeled container for use with transporting and dumping equipment which is of light construction, of pleasing appearance, easy to load to the maximum and provided with cooperating doors to prevent spilling of contents and the emission of noxious odors during transit.

To those skilled in the art changes in the above described illustrative embodiment of the present invention may now be suggested without departing from the present inventive concept. To determine the scope of the present invention reference should be had to the appended claims.

What is claimed is:

1. A container of the character described having a fixed end wall, side walls, and top and bottom walls, the end of said container opposite said fixed end wall including a pair of separately operable upper doors hinged at their tops for closing the upper portion of said end and a lower door hinged at its bottom for closing the lower portion of said end, wheels mounted on said container, and a towing tongue pivotally mounted on said fixed end wall.

2. A container of the character described having a fixed end wall, side walls, and top and bottom walls, the end of said container opposite said fixed end wall including a pair of separately operable upper doors hinged at their tops for closing the upper portion of said end and a lower door hinged at its bottom for closing the lower portion of said end, and a bail pivotally mounted on said fixed end wall and providing an axis about which said container may tilt when said container is supported by said bail.

3. A container of the character described having a fixed end wall, side walls, and top and bottom walls, the end of said container opposite said fixed end wall including a pair of separately operable upper doors hinged at their tops for closing the upper portion of said end and a lower door hinged at its bottom for closing the lower portion of said end, wheels mounted on said container, jacks mounted on said container and cooperating with said wheels to provide a four-point support for said container, and a towing tongue pivotally mounted on said fixed end wall.

4. A container of the character described having a fixed end wall, side walls, and top and bottom walls, the end of said container opposite said fixed end wall including a pair of separately operable upper doors hinged at their tops for closing the upper portion of said end and a lower door hinged at its bottom for closing the lower portion of said end, and means carried by said container for supporting said container on the ground.

5. A container of the character described having a fixed end wall, side walls, and top and bottom walls, the end of said container opposite said fixed end wall including a pair of separately operable upper doors hinged at their tops for closing the upper portion of said end and a lower door hinged at its bottom for closing the lower portion of said end, spring means cooperating with the hinges of said upper doors for urging said doors upwardly to open position, and means mounted on said container for supporting said container on the ground.

6. A container of the character described having a fixed end wall, side walls, and top and bottom walls, the end of said container opposite said fixed end wall including a pair of separately operable upper doors hinged at their tops for closing the upper portion of said end and a lower door hinged at its bottom for closing the lower portion of said end, locking means on the container cooperating with the lower door for retaining the lower door in closed position, selectively operable locking means cooperating with said upper doors for retaining either or both of said upper doors in closed position, and means mounted on said container for supporting said container on the ground.

GEORGE R. DEMPSTER.

REFERENCES CITED

The following references are of record in the file of this patent:

UNITED STATES PATENTS

| Number | Name | Date |
| --- | --- | --- |
| 465,328 | Smith | Dec. 15, 1891 |
| 590,897 | Meht | Sept. 28, 1897 |
| 667,837 | Brandt | Feb. 12, 1901 |
| 836,188 | Hovas | Nov. 20, 1906 |
| 2,070,046 | Gredell | Feb. 9, 1937 |